(12) United States Patent
Ames et al.

(10) Patent No.: US 7,095,504 B1
(45) Date of Patent: Aug. 22, 2006

(54) APODIZATION OF BEAMS IN AN OPTICAL INTERFEROMETER

(75) Inventors: Lawrence L. Ames, San Jose, CA (US); Kalyan Dutta, Los Altos Hills, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 311 days.

(21) Appl. No.: 10/788,166

(22) Filed: Feb. 25, 2004

Related U.S. Application Data

(60) Provisional application No. 60/449,995, filed on Feb. 25, 2003.

(51) Int. Cl.
*G01B 9/02* (2006.01)
(52) U.S. Cl. ...................... 356/498; 356/486
(58) Field of Classification Search ................ 356/486, 356/487, 493, 498, 500, 450
See application file for complete search history.

(56) References Cited

U.S. PATENT DOCUMENTS

| | | | |
|---|---|---|---|
| 4,514,850 | A | 4/1985 | Holmes et al. |
| 5,090,803 | A | 2/1992 | Ames et al. |
| 5,291,570 | A | 3/1994 | Filgas et al. |
| 5,452,392 | A | 9/1995 | Baker et al. |
| 6,483,982 | B1 | 11/2002 | Takahashi |
| 6,646,723 | B1 | 11/2003 | Dubovitsky et al. |
| 6,710,880 | B1 | 3/2004 | Zhao |

FOREIGN PATENT DOCUMENTS

WO    WO 3021319 A2    3/2003

OTHER PUBLICATIONS

U.S. Appl. No. 10/787,662, filed Feb. 25, 2004, Ames et al.
U.S. Appl. No. 10/349,758, filed Jan. 22, 2003, Ames et al.
U.S. Appl. No. 10/293,209, filed Nov. 12, 2002, Ames et al.
U.S. Appl. No. 10/180,086 filed Jun. 27, 2002, Ames et al.
Ames, Lawrence, et al., "SIM external metrology beam launcher (QP) development," Lockheed Martin Advanced Technology Ctr./ Lockheed Martin Jet Propulsion Lab, SPIE Conference, Kona Hawaii, 2002 [4852-55].
Halverson, Peter G., et al., "Techniques for the Reduction of Cyclic Errors in Laser Metrology Gauges for the Space Interferometry Mission," presented at American Society for Precision Engineering ASPE's 16th Annual Meeting, Nov. 10-15, 2001.
Zhao, Feng, et al. "Development of Sub-nanometer Racetrack Laser Metrology for External Triangulation Measurement for the Space Interferometry Mission", presented at American Society for Precision Engineering ASPE's 16th Annual Meeting, Nov. 10-15, 2001.

*Primary Examiner*—Gregory Toatley
*Assistant Examiner*—Marissa J Detschel
(74) *Attorney, Agent, or Firm*—McDermott Will & Emery LLP

(57) ABSTRACT

An interferometry apparatus comprises one or more beam generators, a detector, and a plurality of optical paths along which one or more beams of light propagate. Disposed along at least one of the optical paths is an apodization mask to shape one of the beams.

34 Claims, 12 Drawing Sheets

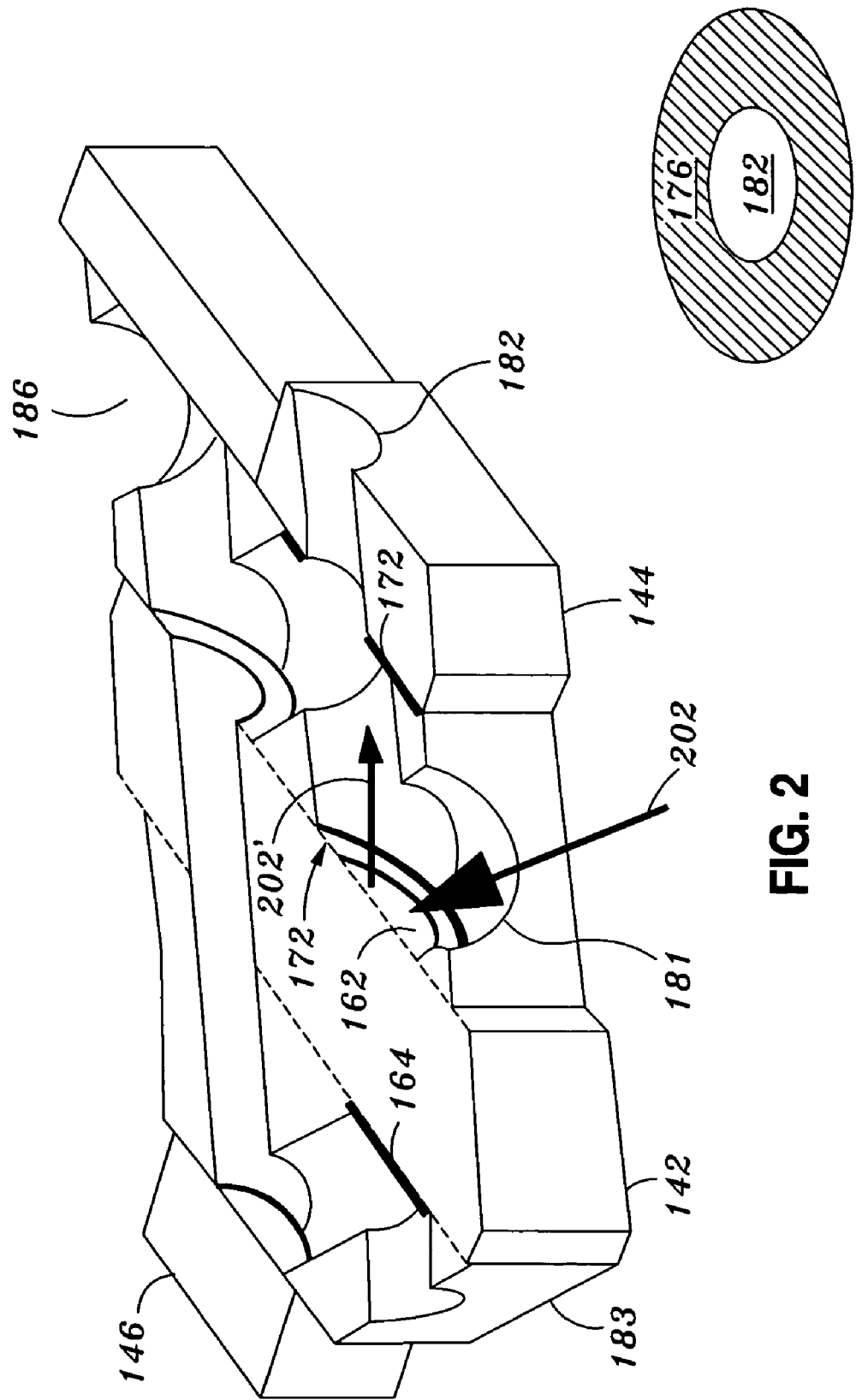

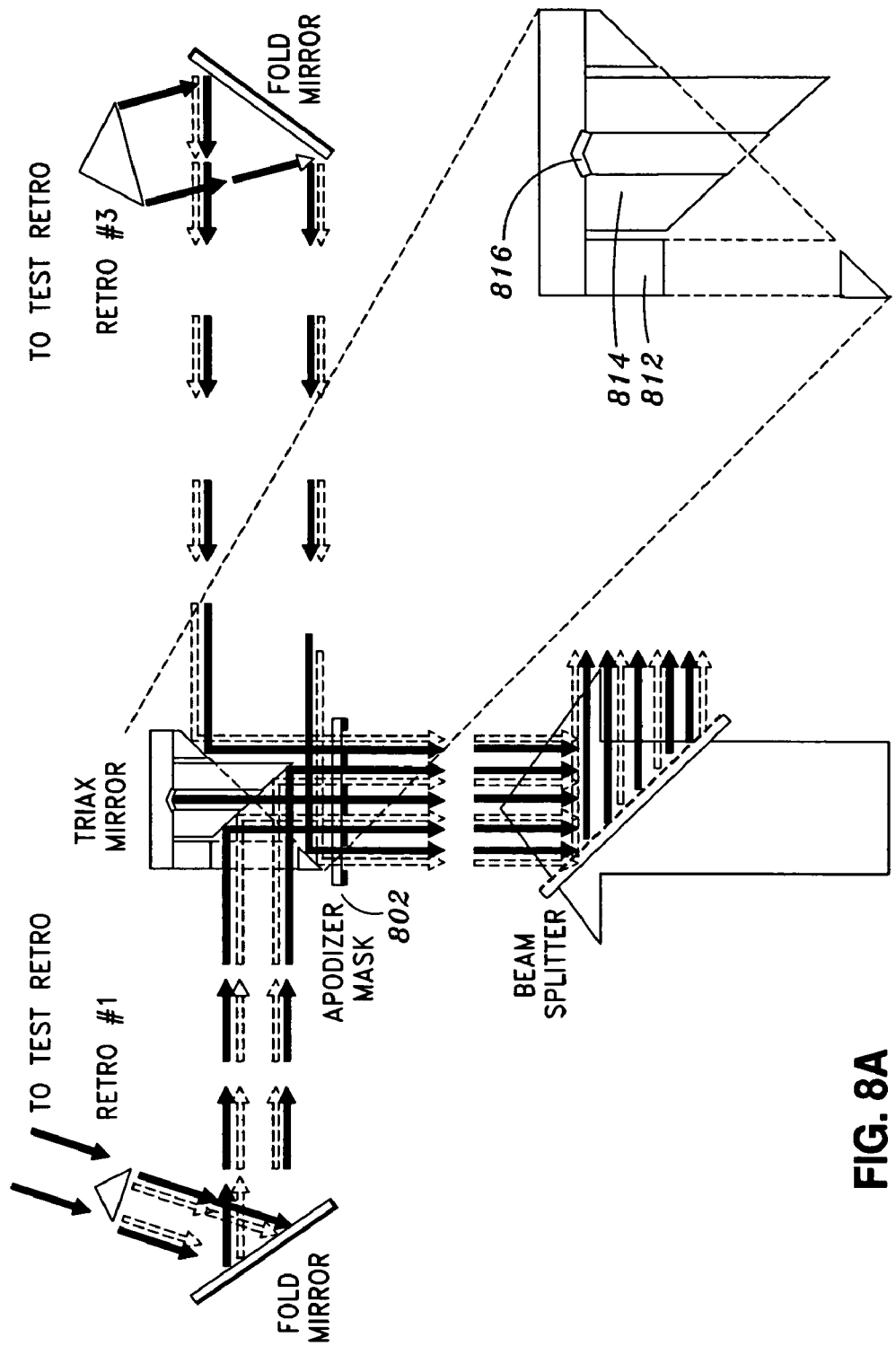

APODIZATION OF BEAMS IN AN OPTICAL INTERFEROMETER

CROSS-REFERENCES TO RELATED APPLICATIONS

The present invention claims priority to U.S. Provisional Application No. 60/449,995, filed Feb. 25, 2003 and is herein incorporated by reference for all purposes.

The present invention is related to the following commonly owned, co-pending applications: U.S. application Ser. No. 10/180,086, filed Jun. 27, 2002), U.S. application Ser. No. 10/349,758, filed Jan. 22, 2003), U.S. application Ser. No. 10/293,209, filed Nov. 12, 2002), and U.S. application Ser. No. 10/787,662, concurrently filed herewith, entitled "A Symmetric Periscope, Concentric Beam Configuration for an Ultra-high Precision Laser Interferometric Beam Launcher", each of which are herein incorporated by reference for all purposes.

STATEMENT AS TO RIGHTS TO INVENTIONS MADE UNDER FEDERALLY SPONSORED RESEARCH OR DEVELOPMENT

The U.S. Government has a paid-up license in this invention and the right in limited circumstances to require the patent owner to license others on reasonable terms as provided for by the terms of NASA SIM Prime Contact No. NAS7-1407 awarded by the National Aeronautics and Space Administration (NASA).

BACKGROUND OF THE INVENTION

The present invention relates generally to interferometry and in particular to improved performance of interferometry by the patterning or otherwise shaping of one or more beams in an interferometric device.

Precision laser interferometry can be used to precisely determine (or monitor changes of) the distance to one or more fiducial points, such as a flat mirror, rooftop mirror, or corner-cube retro-reflector ("retro"), or between such fiducial points. An interferometer generally is composed of three components or subsystems: (1) a radiation source (e.g., a laser device or some other suitable beam generator), (2) an optics component for producing beams of light for reference, measurement, and so on (also referred to as a "beam launcher"), and (3) a signal processor (e.g., an observer or a photo-detector and associated electronic circuits) or other processing component to perform the interferometric determinations. In some configurations, the photo-detector is included in the optical component (beam launcher), while much of the supporting electronics (e.g., the phase meter(s) and computer) remain with the signal processor. As can be appreciated other subsystem configurations are possible.

Interferometers can be configured to operate in a number of ways. The present invention is applicable to optical interferometers in general, operating in the regions of the electromagnetic spectrum commonly referred to as the infrared (IR) light region, visible light region, and ultra-violet (UV) light region. Since there are many configurations of optical interferometers, only a small sampling of interferometer configurations will be discussed for background purposes. It will therefore be understood that a "beam" in the context of the present invention can be IR, visible light, or UV.

Some interferometers monitor the distance between two retros by directing a single beam towards a first one of the retros. The single beam hits the first retro at a point that is offset from a vertex of the retro. The retro-reflected beam emerges from the first retro at a symmetrically located offset point, and the beam then is directed to a second retro. The beam and retros are positioned and aligned such the reflected beam hits the second retro also offset from the vertex, with the emerging beam doubly reflected back to an entrance point on the launcher. Such a circuitous configuration is sometimes referred to as a "racetrack" configuration.

Precision laser interferometry can be carried out in at least two modes, namely, the "homodyne" mode or the "heterodyne" mode. Either mode can be used for either the racetrack configuration.

In the homodyne mode, a beam launcher splits a laser beam of a single frequency into two beams. One beam is directed out to the fiducial(s) to measure the distance. Upon returning to the beam launcher, the beam is aligned and collocated (and the polarization aligned, if needed) with the other portion of the original beam, and the resulting combined beam is directed onto a photo-detector. If the extra distance traveled by the measurement beam is an integer multiple of half the laser wavelength, then, when recombined, the two beams are in phase and add constructively, resulting in an increased signal from the photo-detector. If the measurement beam is an odd multiple of a quarter of the wavelength longer, the beams add destructively, resulting in a reduced signal from the photo-detector. If the distance between the retros changes, the signal fluctuates, and the fluctuations in the signal give a measure of the relative motion of the retros. A signal processor (e.g., an observer or a photo-detector and electronic circuit) "counts fringes" to determine the change in distance between the retros relative to an initial distance. The resolution of a homodyne interferometer is limited, as it is difficult to measure changes in distance significantly smaller than the laser wavelength (typically a half to several micrometers) due to intensity fluctuations of the laser.

A heterodyne interferometer configuration uses two beams that are offset in frequency to slightly different frequencies. Typically, the beams originate from a single laser. The difference between the frequencies is chosen to be convenient for detectors and electronics. Typically, the frequency difference is in the range of about 10 kHz to about 100 MHz. Typically, one frequency-offset laser beam (the "measurement beam") emanates from the beam launcher to interrogate the distance to the retro(s) while the second frequency-offset laser beam (the "local oscillator" or LO) beam remains internal to the beam launcher. When the measurement beam and the LO beam are aligned, collocated, and with aligned polarizations, and are directed onto the photo-detector, the photo-detector produces a "beat" signal. By comparing this beat signal to the known difference of frequency offsets between the laser beams, it is possible to track changes in the relative phase of the signal to find the change in retro distance relative to the initial value. With precision phase meters, it is possible to resolve distances to small fractions of the laser wavelength, resulting in measurements with sub-nanometer precision.

When measuring distances with fine precision, various error sources can affect the results. The laser intensity can fluctuate. The laser radiation is often routed to the beam launcher by means of optical fibers, where small effects such as a temperature variation or a strain on the fiber can affect the apparent optical length of the fiber and can result in a phase change that erroneously appears to be a measured displacement of the fiducial points. These errors can be reduced by replacing the "known difference" of the laser frequency offsets with a "reference signal" that measures the frequency difference directly. This reference signal is created by mixing a portion of the LO beam with the "reference beam", which is a portion of the first laser beam that does not interrogate the distance between retros, and directing the combined beam onto a second photo-detector. The use of a reference beam significantly reduces the errors introduced by any common element (e.g., laser or fiber), but it cannot correct for elements that are unique to the measurement path or the reference path. Other errors can be reduced by sharing elements between the measurement and LO beams. The measurements are not affected by elements in the beam-path "downstream" from the point where the two laser beams are first combined (the point where they become aligned, like-polarized, and collocated), as the elements are common to both beams.

In the optical component referred to as the beam launcher, the various beams of light are bent in different directions (e.g., by the use of reflecting surface such as mirrors) and made to pass through various openings formed in the beam launcher. The diffraction of light that results when a wide beam of light passes through an opening that is narrower than the beam width is generally an undesirable artifact. When such a diffracted beam propagates a distance, the fringing effect becomes more pronounced. These optical artifacts may result in cross-talk if light rays from different beams go to the wrong detector channels, thus giving rise to "cyclic error" that can result in erroneous distance determinations. It is possible to model these diffractive affects and to introduce masks that reduce the effect, as disclosed in U.S. application Ser. No. 10/293,209, for example. However, it may be necessary to mask out more of the beam than is desirable from the point of view of laser power conservation.

Additionally, a beam may hit an optic surface at its edge (e.g., a hole in a separation mirror). It is difficult to maintain adequate mirror surface quality immediately adjacent to an edge. There are often chips in the surface, bevels, or other surface irregularities. These artifacts can also result in diffraction artifacts.

BRIEF SUMMARY OF THE INVENTION

The present invention comprises an optical interferometer device having one or more apodization masks disposed along optical paths in the device. An aspect of the invention is the use of one or more apodization masks to shape one or more beams to produce shaped beams as needed. A shaped beam can include a first beam portion having apodized edges to reduce diffraction during propagation over a distance. The shaped beam can include a shadow region between first and second beam portions. The shadow region can correspond to the shape of an edge of a optic element so that the edge can be enveloped by the shadow region when the shaped beam is transmitted to the optic element, thus avoiding diffraction that might arise from surface defects at the edge.

BRIEF DESCRIPTION OF THE DRAWINGS

The present invention is described in further detail by way of illustrative embodiments as shown in the following figures, wherein:

FIG. 2 is a cutaway view of the optical component (beam launcher) component shown in FIG. 1;

FIG. 2A shows a projected view as seen along the direction of the reflected source beam 202' shown in FIG. 2;

FIGS. 8A and 8B illustrate another apodization mask configuration; and

DETAILED DESCRIPTION OF THE INVENTION

The following description of the present invention is presented with respect to a specific interferometer device that was under study at the time of the invention. However, it will be clear to one of ordinary skill, from the following discussion, that the present invention can be adapted for use in any kind of optical interferometer.

Figure 1:
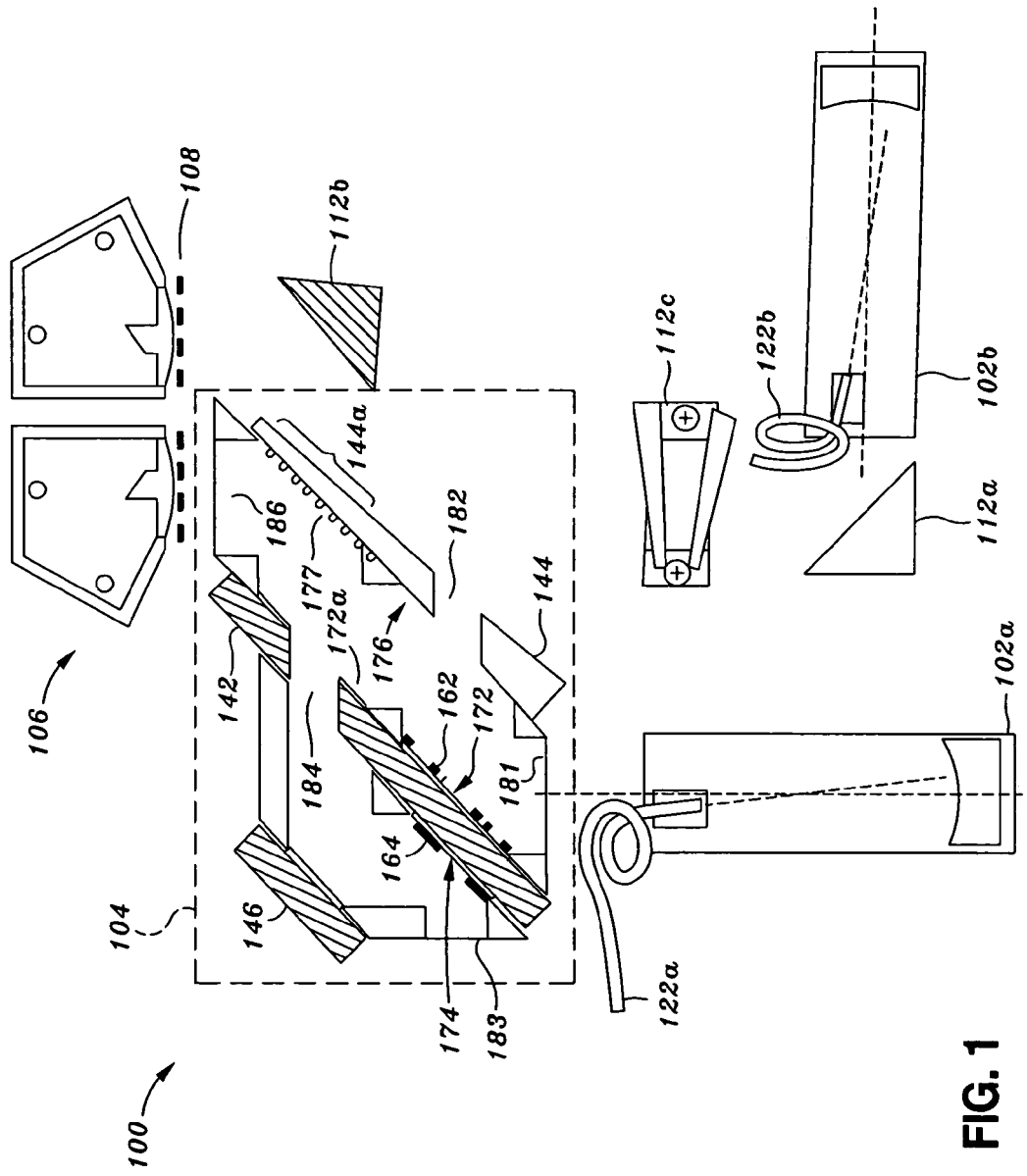
FIG. 1 is a simplified schematic showing an illustrative embodiment of an interferometer according to the present invention.

FIG. 1 shows the basic components of an optical interferometer in the context of a specific illustrative embodiment. The interferometer configurations that is shown in the figure is known as a "common path heterodyne interferometer" (CoPHI). The CoPHI interferometer shown in FIG. 1 operates is arranged in a "racetrack" (RT) configuration. A source beam directed to the optical component 104 is provided by a collimator 102a. In the specific embodiment shown, the collimator 102a is an off-axis parabolic collimator. This component is described in more detail in U.S. application Ser. No. 10/349,758. It can be appreciated of course that any other suitable device for the collimator 102a can be used, and that the collimator shown in the figure is shown merely as an illustrative example of a device that produces a beam that enters the optical component 104.

For heterodyne mode operation, a second collimator 102b is provided. In the specific embodiment shown, the second collimator is also an off-axis parabolic collimator. As with collimator 102a, any other suitable device for the collimator 102b can be used.

An optical component 104 collectively referred to herein as the beam launcher receives and directs the source beams produced by collimators 102a and 102b. The optical component (beam launcher) 104 comprises various optic surfaces and openings to define optical paths with the component. The openings are identified by the reference numerals 181–186. The surfaces of the optical component 104 include reflective surfaces 172, 174 of a double-sided mirror 142. An opening 184 is provided in the double-sided mirror 142 and a reflective surface 172a having an opening is aligned with opening 184. A mirror 144 is provided with an opening 182 and a reflective surface 176 having an opening aligned with the opening 182. The mirror 144 includes a beam combining segment 144a that is semitransparent and includes a diffraction grating 177. The optical component 104 also includes a fold mirror 146. In the embodiment described herein, the reflective surfaces comprise layers of Au (gold) deposited by known thin film deposition methods. It can be appreciated that the reflective surfaces can be produced with other materials and using other fabrication techniques. Disposed on the reflective surface 172 is a first apodization mask 162. A second apodization mask 164 is disposed relative to the reflective surface 174.

To complete the discussion of FIG. 1, additional optics include fold mirrors 112a and 112b to direct the light produced by the collimator 102b to one of the photodetectors of a dual detector component 106. A pair of shallow wedge prisms form a "Risley pair" (Risley prism) 112c for increased precision alignment. The opening 186 of the optical component 104 is aligned with the other photodetector. The photodetector 106 comprises known processing electronics such as detectors, pre-amps, phase meters, and so on to perform interferometric measurements. A mask 108 is provided at the entrances to each of the photodetectors of the dual detector component 106. The mask is to help reduce signal cross-talk, a cause of cyclic error. Additional detail of the mask 108 is provided in U.S. application Ser. No. 10/293,209, filed Nov. 12, 2002.

Additional detail of the optical component (beam launcher) 104 is provided in a concurrently filed, commonly owned U.S. application Ser. No. 60/449,993 entitled "A Symmetric Periscope, Concentric Beam Configuration for an Ultra-high Precision Laser Interferometric Beam Launcher". The cutaway view of the optical component 104 shown in FIG. 2 is provided for purposes of explaining the present invention. A source beam 202 enters the opening 181 and is reflected off of the reflecting surface 172, which is shown in FIG. 2 with apodization mask 162. The reflected beam 202' is then directed along the path shown by the arrow toward the mirrored opening comprising the reflecting surface 176 and opening 182.

Figure 3A:
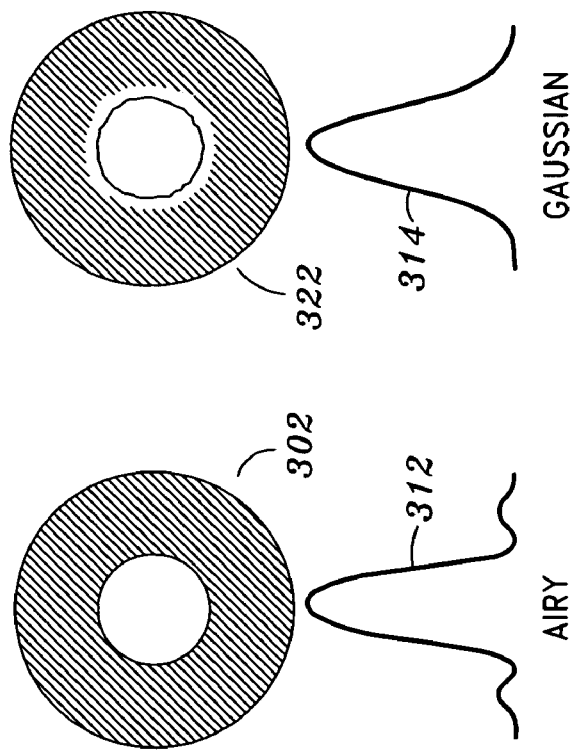
FIG. 3A compares the performance of apodization masks versus hard edges.

Refer for a moment to the diagrams shown in FIG. 3A. When a Gaussian beam of light passes through an aperture 302 that is smaller than the beam diameter, the Gaussian beam will be clipped by the hard edge of the aperture. Similarly, a beam reflected from a reflective surface that is smaller than the incident beam will be clipped. The clipping will create an intensity profile 312, such as an Airy fringe pattern, due to diffraction effects. As the beam propagates over a distance, the diffraction effects worsen. However, if a beam is shaped by a mask having a Gaussian or other similar soft, apodized edge, the resulting shaped beam can then be directed to the aperture 302 to produce an exit beam that exhibits a near-Gaussian intensity profile 314 having greatly reduced, or none, of the diffraction artifacts of the Airy-like profile 312. As an observation, a beam reflected from a surface that is narrower than the incident beam width will exhibit an Airy intensity profile as well. It is noted that while the beams shown are roughly Gaussian, this is not a requirement. Nonetheless, the problems presented by a hard edge of a transmissive or reflective surface may still apply.

Figure 3B:
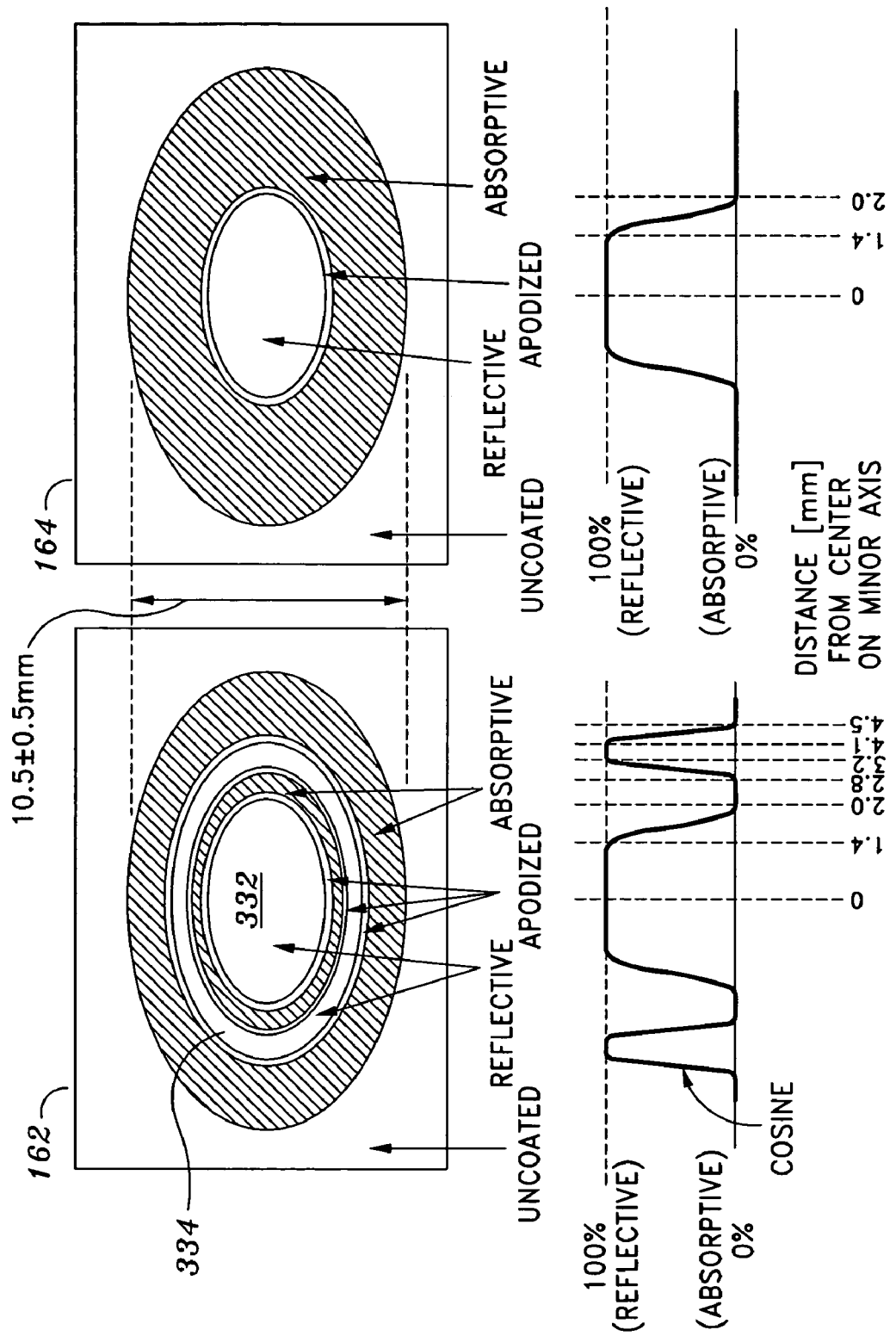
FIG. 3B illustrates the apodization masks shown in FIG. 1.

Returning to FIG. 2, it can be seen, therefore, that if the reflecting surface 172 did not have the apodization mask 162, then the reflected source beam 202', as it passed through the opening 182, would exhibit an intensity profile such as the Airy fringe pattern shown in FIG. 3A. However, in accordance with this specific embodiment of the present invention, a first apodization mask 162 having the pattern shown in FIG. 3B is provided on surface 172. A second apodization mask 164 having the pattern shown in FIG. 3B is provided on reflective surface 174.

The purpose of the apodization masks (also, referred to as "optical apodizers") is to take a wide high quality wave-front-corrected beam (e.g., the beam from the first collimator 102a, FIG. 1) and excise a narrower, well-mannered, quasi-Gaussian-shaped beam which possesses diffraction rings of acceptably low intensity that would contribute negligibly to instrument noise. Since the mirrored opening (182, 176) is on an angle (in this case a 45° angle) with respect to the incident beam 202', the mirrored opening appears as an elliptical annulus surrounding an elliptical opening, as illustrated in FIG. 2A. Therefore, the pattern of the apodization mask 162 has a corresponding elliptical shape.

As can be seen in FIG. 3B, the pattern for the apodization mask 162 comprises concentric areas of reflective and absorptive regions, with apodized regions formed between the reflective and absorptive regions. This particular mask pattern is adapted for improving cross-talk performance by improving spatial separation in concentric interferometer configurations, such as the configuration such as the "common path heterodyne interferometer" (CoPHI) of FIG. 1.

Returning to FIG. 3B, the intensity profile of a beam shaped by the apodization mask 162 is shown in the chart below the pattern for the apodization mask. The concentric arrangement matches the mirrored opening (182, 176) of the beam splitter. Thus, when source beam 202 is directed to the apodized surface (162, 172), a central reflective region 332 of the apodization mask 162 reflects a core portion of the apodized source beam 202. The core portion has a Gaussian-like intensity profile and is smaller in breadth than the opening 182. Its edge is apodized and thus it's intensity quickly approaches zero toward the edge. Consequently, when the core portion passes through the opening 182 there is little or no diffraction.

An annular reflective region 334 of the apodization mask 162 reflects an annular portion of the apodized source beam 202 toward the reflective surface 176. The annular portion also exhibits a Gaussian-like intensity profile, having apodized inner and outer edges. Thus, the intensity approaches zero at both the inner and the outer edges of the annular portion. In addition, an annular shaped shadow region between core portion and the annular portion forms a shadow that envelopes the edge of the opening 182 so that substantially none of the light from the source beam 202 will fall on the edge. Consequently, there is substantially no formation of diffraction patterns or other diffractive artifacts that might arise due to surface defects common in optics near edges. The apodization mask 162 also shapes the core portion of the source beam, giving the beam a "fuzzy" (apodized) edge that propagates over distance with less diffraction. Thus in general, an apodization mask can be patterned to produce a shaped beam that contains beam portions which have apodized edges so that those beam portions can propagate over a distance with less diffraction. Equally significant, is that the apodization mask can be patterned so that the shaped (apodized) beam can contain shadow regions that can be aligned to envelope edge portions of an optic element on which the shaped beam is incident, thus avoiding or otherwise greatly reducing diffraction effects.

FIG. 3B also shows the pattern for apodization mask 164. As will be seen in the discussion below, the beam that will fall on the apodization mask 164 is a return beam. It may be desirable to shape the return beam to account for diffraction of the beam as it traverses the distance to and from a target comprising one or more fiducial points. Since the reflective surface 174 is on angle relative to the incident return beam, the projection of the beam on the surface will be elliptical and hence the pattern is correspondingly elliptical.

Specific design parameters for the apodization mask of course will vary from one interferometer design to another, depending on the beam shapes used in the interferometer. Typical design considerations include the apodization gradient function. The apodization gradient used for the apodization masks 162, 164 was a cosine function. However, depending on a particular embodiment, it may be desirable to use other functions. For example, a linear gradient might be more suitable.

An apodization mask can be fabricated using known deposition techniques to form a pattern on a surface. Known techniques include the use of partially-transmitting reflectors or absorbers (e.g., thin coatings) of varying thickness—this is the way they are normally made. Alternatively, an opaque material (e.g., cutouts in thin metal) can be machined. The edges of the cutouts can be a starburst pattern, or a toothed-gear pattern, for example, to achieve a desired intensity profile.

Figure 4C:
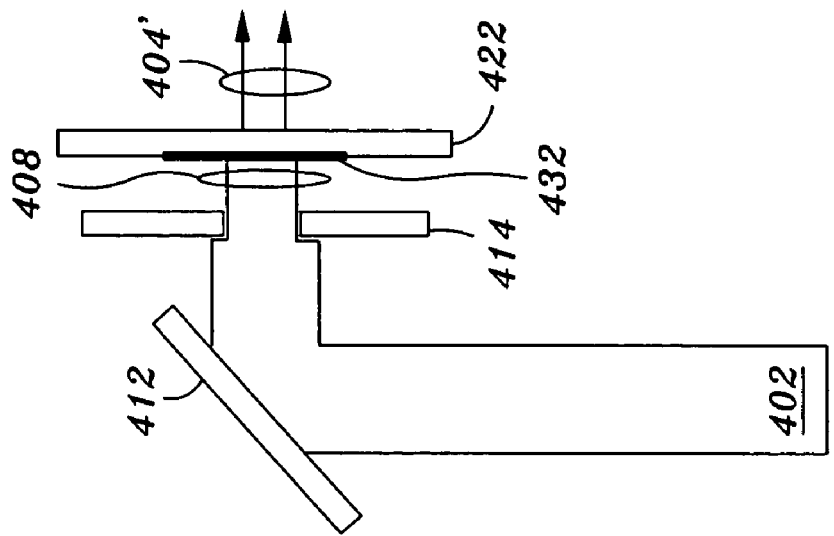
FIGS. 4A–4C illustrate various apodization mask placements.
Figure 4B:
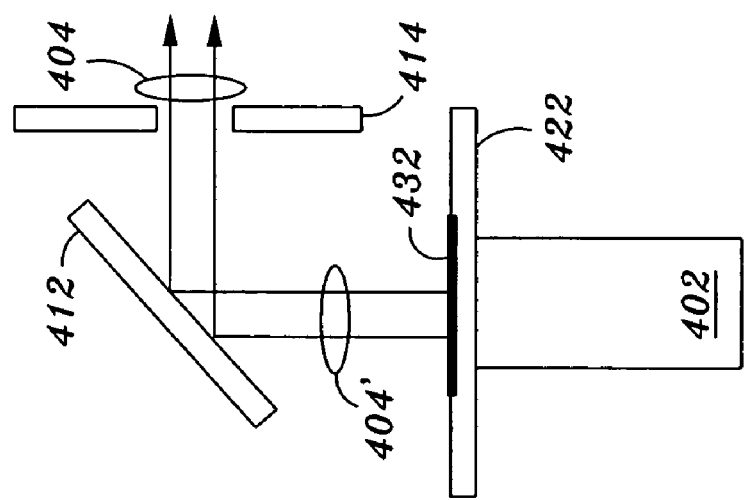
Figure 4A:
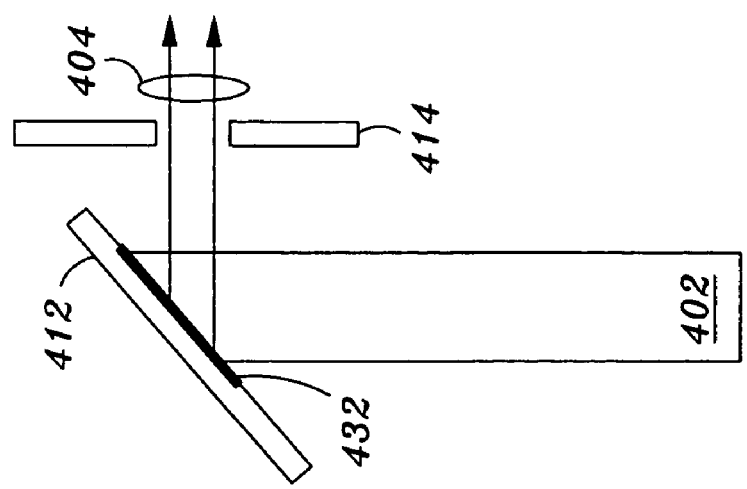

A salient aspect of the present invention is the use of one or more apodization masks suitably placed in the optical path to control diffraction effects. The apodization masks pattern and otherwise shape the beam as discussed above to obtain a shaped beam having a desired intensity profile. This may include forming shadow regions in the shaped beam which can then be aligned with edges of a hole or other vignetting optics. FIG. 2 shows the apodization mask 162 being deposited on the reflecting surface 172. However, it can be appreciated that placement of an apodization mask can be made anywhere along the optical path. FIGS. 4A–4C illustrate this aspect of the present invention.

FIG. 4A shows mask placement as discussed in connection with apodization mask 162. Here, an apodization mask 432 is formed on a reflective surface 412. When the incident beam 402 is reflected, its intensity profile is suitable shaped. FIG. 3B shows some examples of shaping. The shaped beam is then directed through an aperture 414, and if the intensity profile is such that the beam is narrower than the aperture, the exiting beam 404 will exhibit low diffraction artifacts.

FIG. 4B shows a mask placement that is "upstream" in the incident beam; i.e., the incident beam itself is shaped before it falls on the optic element. Thus, a suitable transmissive substrate 422 can be patterned with an appropriate apodization mask 432. The apodization mask 432 in this case is therefore transmissive, rather than being reflective, so that light can pass through and be shaped by the pattern formed on the substrate. Consequently, the apodized beam 404' will exhibit the desired intensity profile. When the apodized beam 404' is subsequently directed by the reflective surface 412 through the aperture 414, the exiting beam 404 will have little or no diffraction artifacts.

FIG. 4C shows a mask placement that is "downstream" in an exit beam 408. Here, the incident beam 402 is directed through the aperture 414 by reflective surface 412. Since the width of the incident beam is greater than that of the aperture 414, the exit beam 408 will be subject to diffraction. The exit beam 408 is directed to an apodization mask 432 that is patterned or otherwise formed on a substrate 422. The exit beam 408 is thereby shaped by the mask to produce an apodized beam 404'. Again, the substrate 422 is transmissive, with a suitable pattern to produce a transmissive apodization mask.

It is noted that in FIGS. 4B and 4C, the substrate 422 itself can be machined (e.g., cutout) with an opening with a patterned edge. As mentioned above, the edge can be formed with a starburst pattern, or a tooth-gear pattern. Other patterns can be used to obtain shaped beams having desired intensity profiles.

Figure 4D:
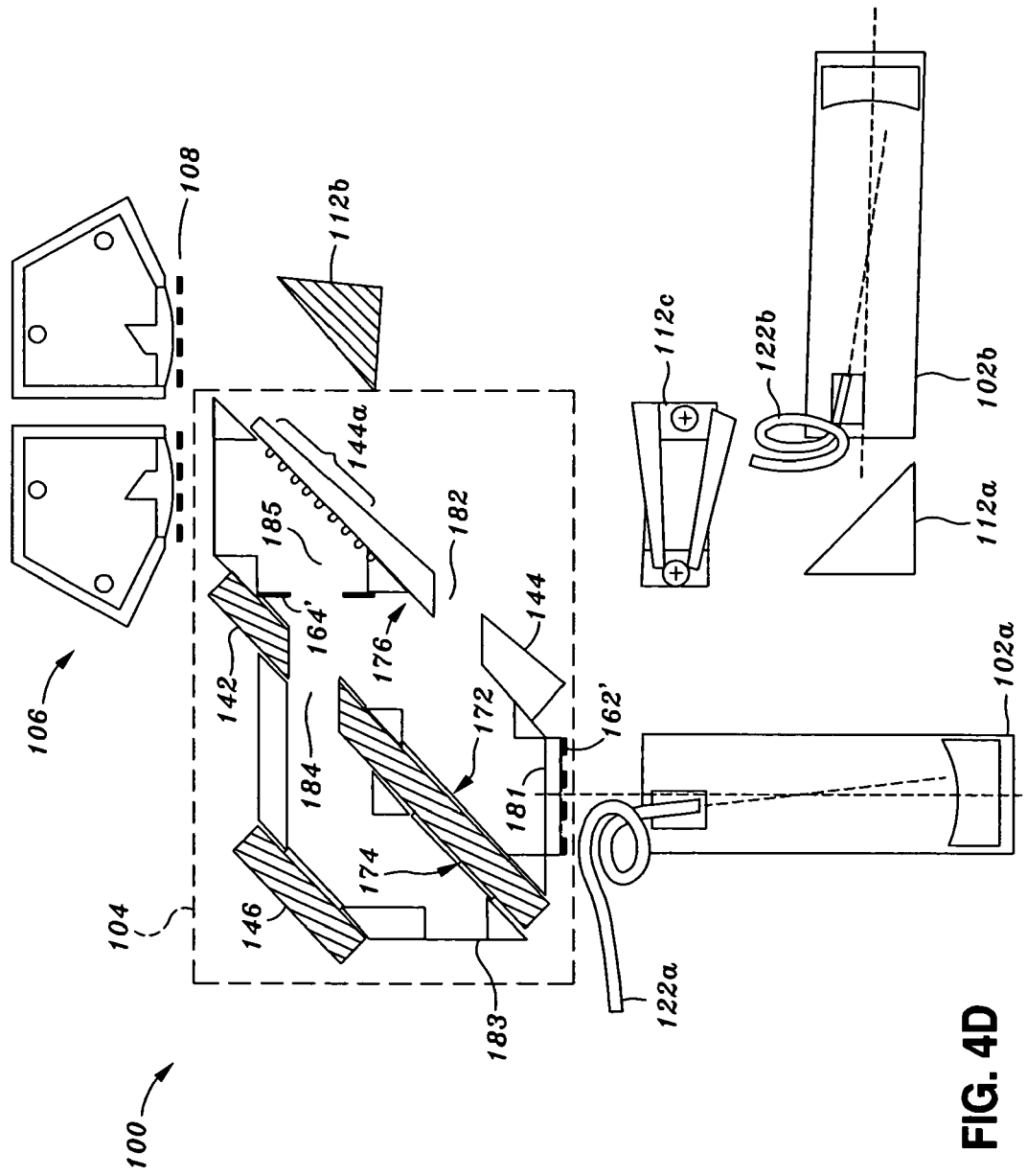
FIG. 4D illustrates an alternative embodiment of the device shown in FIG. 1.

FIG. 4D shows an alternate embodiment of the device of FIG. 1, illustrating alternative placement of apodization masks. For example, the apodization mask 162 shown in FIG. 1 can be positioned in a "upstream" location. FIG. 4D shows a mask 162' disposed in front of the opening 181 of the optic component 104, placed in the path of the incident beam. In this embodiment, the apodization mask 162' may comprise a pattern formed on a transmissive substrate. The apodization mask 162' may comprise a machined opaque substrate. As mentioned above, a cutout having edges in the shape of a starburst pattern or toothed gear pattern might be suitable.

FIG. 4D further shows that the apodization mask 164' can be formed on a transmissive substrate disposed in the opening 185. This placement is not dictated by the apodization mask itself, but rather is dictated by the nature of the particular configuration of interferometer disclosed. The location of the mask 164' is along a path where the return beam 506 and the reference beam 504' lie along a common path. In this way, any optical distortion artifacts introduced by the mask 164' (e.g., thermal drift error due to temperature variations) affect both the return beam 506 and the reference beam 504'. On the other hand, if the acceptable margin for error is sufficiently wide, then the mask 164' can be placed in the optical path of the return beam, e.g. in front of the opening 183. This common path aspect of the interferometer is discussed in more detail in the concurrently filed, commonly owned U.S. application No. 10/787,662 entitled "A Symmetric Periscope, Concentric Beam Configuration for an Ultra-high Precision Laser Interferometric Beam Launcher".

Figure 5:
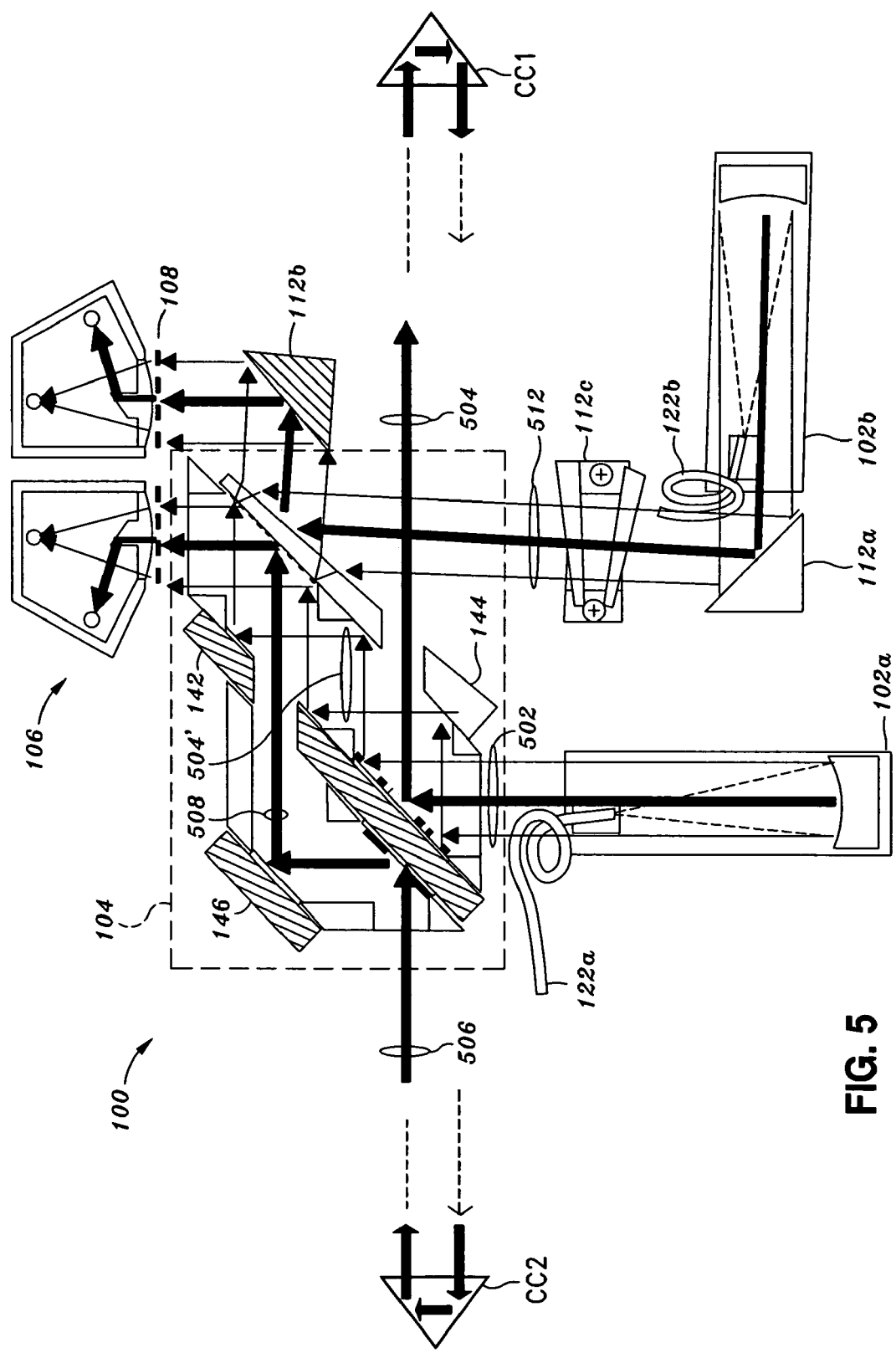
FIG. 5 shows the optical paths of the interferometer configuration shown in FIG. 1.

FIG. 5 shows the beam paths in the illustrative interferometer shown in FIG. 1.

Figure 6:
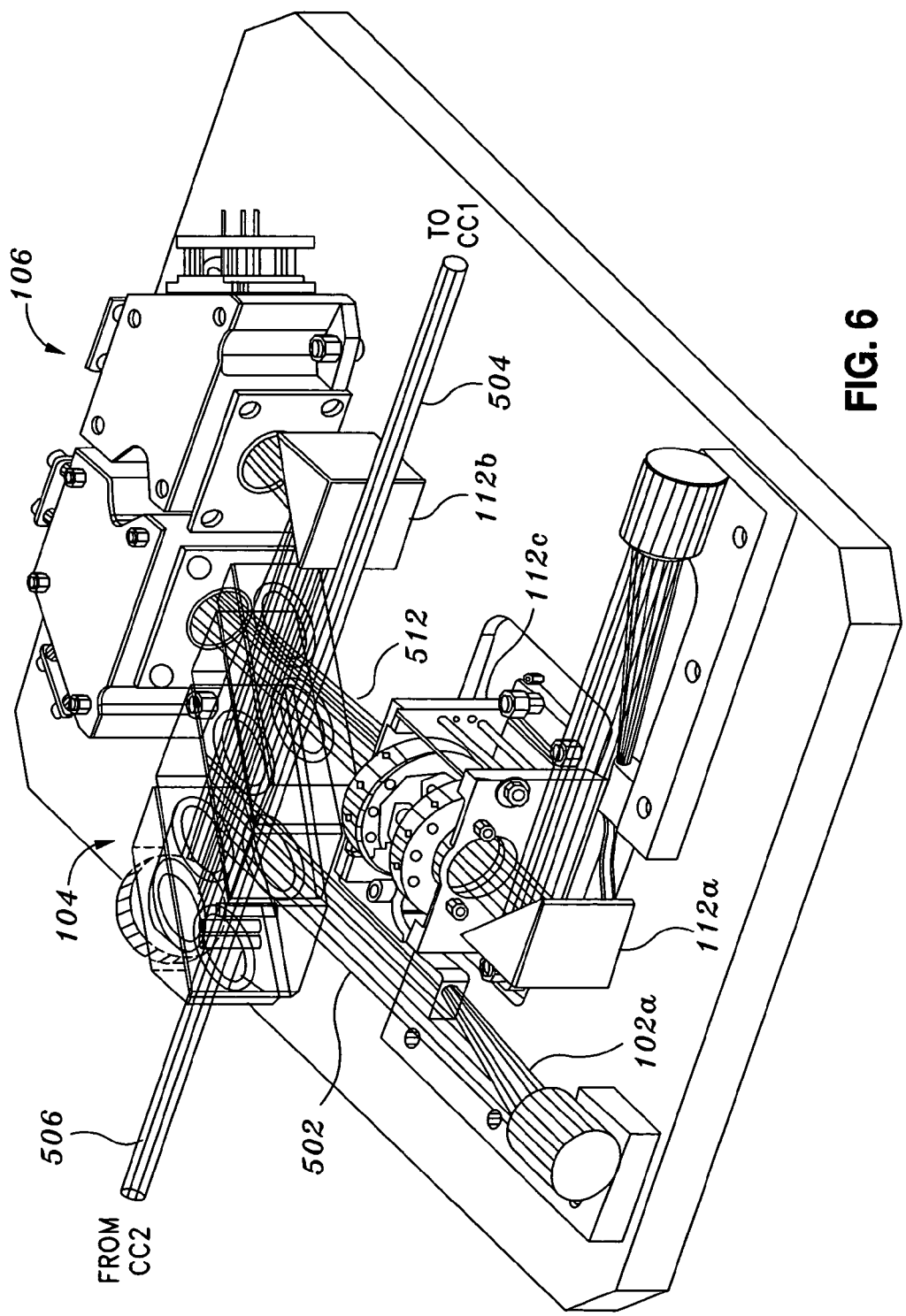
FIG. 6 is a screen shot of a solid-model rendering of the interferometer of FIG. 5, produced by a solid-modeling program, isometric view.

FIG. 6 is a screenshot taken from a solid-modeling program called IDEAS used to produce a solid-model rendering of the device and optical paths shown in FIG. 5. As noted above, the present invention has been embodied in a "racetrack" (RT) configured interferometer illustrated in FIG. 1 that operates in heterodyne mode and uses a "reference signal" against which the beat signal is compared to determine changes in distance between the corner cube retro-reflector ("retros") of the racetrack from their original separation distance. The "reference signal" is produced by taking a portion of the source beam that is used for measurement and mixing it with the local oscillator beam (LO beam).

Referring to FIGS. 1 and 5, a first laser beam is provided to fiber optic 122a and is collimated by the collimator 102a to produce a source beam 502. The source beam 502 enters the optic component 104 and is incident upon the double-sided mirror 142. A second laser beam having a frequency different from the first laser beam is provide to fiber optic 122b and collimated by the collimator 102b to produce a local oscillator beam (LO beam) 512. The LO beam also enters the optic component 104 and is incident to the beam combining segment 144a of the mirror 144. The fold mirror 112a may or may not be needed, depending on the physical location of the collimator 102b. The Risley prism pair 112c provides finely tuned alignment of that portion of the LO beam 512 that will be mixed with the reference beam.

The source beam 502 is directed to and reflected by the apodized surface (172, 162) to produce an apodized beam. According to the pattern shown in FIG. 3B for apodization mask 162, the apodized beam comprises a core beam portion which exits through the opening 182 with minimal or no diffraction distortions. This core beam portion constitutes a measurement beam 504 that propagates to a first retro (CC1 in FIG. 5A) and is reflected to a second retro CC2, returning to the device as a return beam 506. The measurement beam 504 in this interrogates the retros to be measured.

The apodized beam also comprises a shadow region that falls on the edge between the reflective surface 176 and the opening 182. The apodized beam further comprises an annular beam portion that is incident upon the reflective surface 176 surrounding the opening 182. The annular beam portion constitutes a reference beam 504' that will be mixed with a portion of the LO beam 512 to produce a "reference signal" used to compare against the beat signal. The reference beam 504' is directed to a second reflective surface 172a formed on the double-sided mirror 142. The second reflective surface 172a directs the reference beam toward the diffraction grating 177.

The return beam 506 enters the optic component 104 through opening 183. The return beam 506 is apodized by the apodization mask 164 to produce an apodized return beam 508. The apodized return beam 508 is then directed toward the diffraction grating 177 via the reflective surface 174 and fold mirror 146. The reference beam and the apodized return beam 508 are recombined by the time the recombined beam is incident on the diffraction grating 177. The diffraction grating mixes the LO beam 512 with the recombined beam and are directed to a first photodetector of the dual photodetector 106. The combining segment 144a is configured as a beam splitter. Therefore, the mixed beams (LO beam and recombined beam) propagate to the fold mirror 112b, and are directed to a second photodetector of the dual photodetector 106.

Disposed in front of each of the two photodetectors is a mask 108. This mask is provided to reduce signal cross-talk. Additional details of this mask are discussed in U.S. application Ser. No. 10/293,209.

Figure 7A:
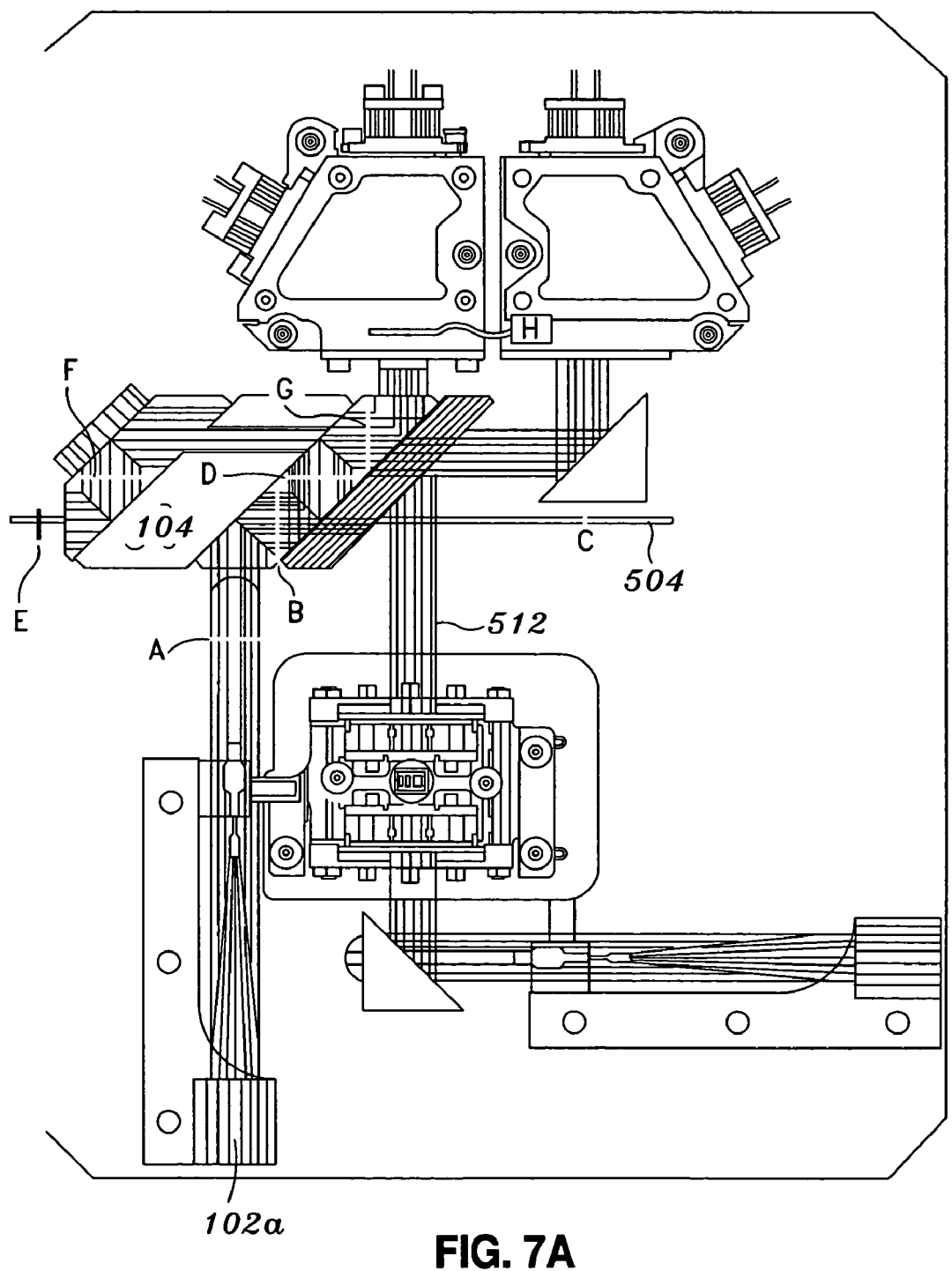
FIGS. 7A and 7B show beam intensity profiles along various points in the optical paths shown on a top view solid-model rendering of the interferometer of FIG. 5.
Figure 7B:
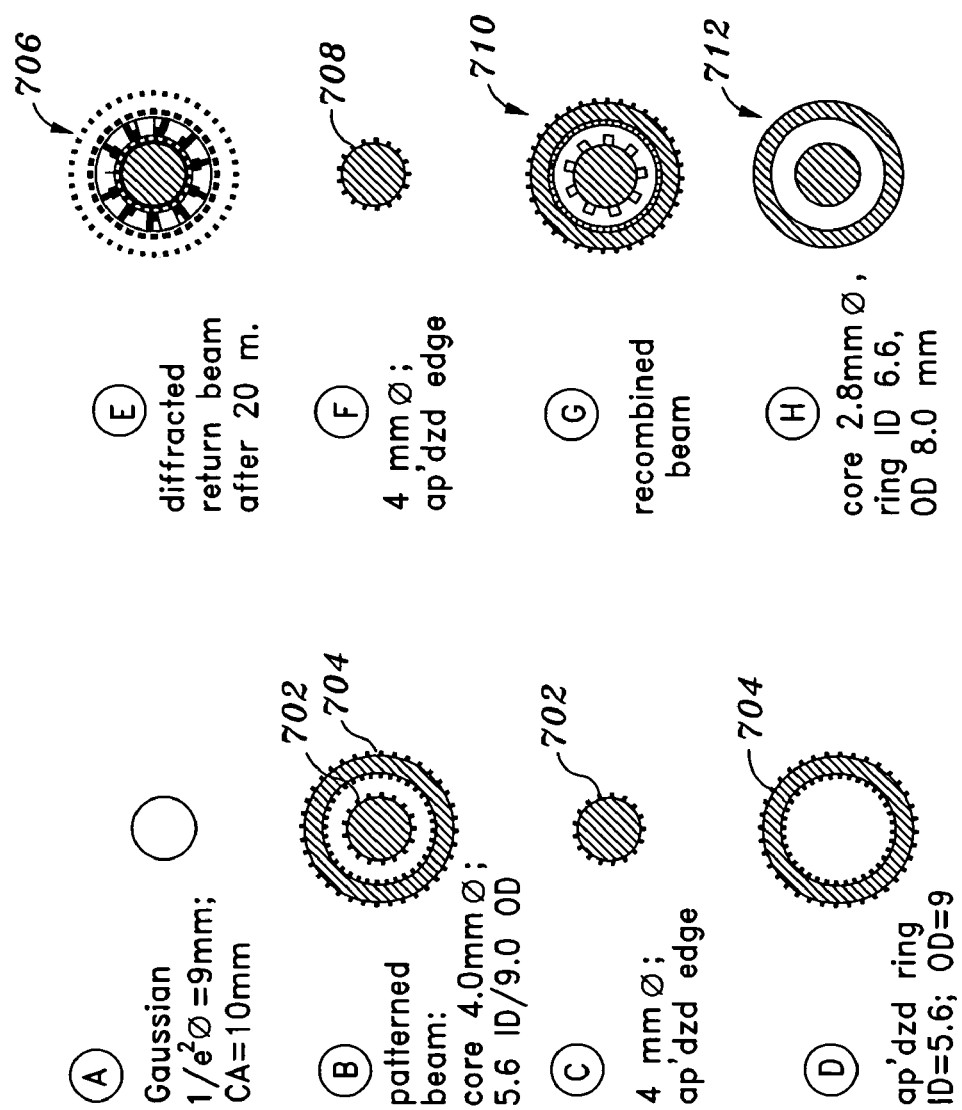

FIGS. 7A and 7B show cross-sectional views of the various beams shown in FIG. 5. A top view solid-model rendering of the interferometer is shown in FIG. 7A. The various beams of interest are identified by reference letters "A" through "H". The cross-sectional views of the identified beams are shown in FIG. 7B. At location "A", the collimated source beam from the collimator 102a exhibits a standard Gaussian intensity cross section 702. At location "B", the collimated source beam has been reflected off the patterned mirror surface (162, 172) to become the patterned (apodized) beam seen at "B". The cross section at "B" shows a central core beam portion having an intensity cross section 702. The central core beam portion constitutes the measurement beam 504 in FIG. 5. The patterned beam at "B" also shows an annular portion having an intensity cross section 704. This annular portion constitutes the reference beam 504' in FIG. 5. At location "C", it can be seen that the intensity cross section 702 of the measurement beam 504, when it exits the optical component (beam launcher) 104, exhibits an apodized edge due to the beam shaping effect of the apodization mask 162 (FIG. 1). The gear-teeth graphics in FIG. 7B are notational conventions used to represent an apodized beam edges. The intensity cross section 704 of the reference beam 504' at location "D" also shows apodized edges.

The measurement beam 504 exits the optic component, interrogates the two corner cube retro-reflector (retros) to be measured, and returns at location "E" as the return beam with an intensity cross section 706. The cross section 706 represents diffraction resulting from propagation of the measurement beam over a large distance and the reflection of the measurement beam by the retros. However, by providing a suitable apodization mask 164 near the entrance for the return beam, the return beam can be shaped and thus cleaned up considerably to become the beam at location "F". The beam cross section 708 at location "F" represents the apodized return beam. At location "G", the reference beam 504' is combined with the apodized return beam to produce concentric beam pattern 710 at "G". The beams are combined with the LO beam 512 at the diffraction grating 177 (FIGS. 1 and 5) in order to create the heterodyne signal. The resulting bundle of beams is cleaned up with a mask 108 to reduce signal cross-talk, resulting in beam pattern 712 at location "H".

In order to highlight that an apodization mask can be adapted in any interferometric device, FIG. 8A shows an interferometer configuration based on a triple-axle-mirror design that is the subject of U.S. application Ser. No. 10/180,086. The figure shows an improvement to the tri-ax mirror design disclosed in U.S. application Ser. No. 10/180,086. The tri-ax mirror shown in FIG. 8A comprises two concentric annular mirrors, an outer annular mirror 812 and an inner annular mirror 814. The improvement includes the a central mirror 816 about which the outer annular mirror 812 and the inner annular mirror 814 are arranged. In the embodiment shown in the figure, the central mirror 816 is a center cube retro-reflector. However, other mirror configurations are possible. The beam reflected by each annular mirror comprises two concentric annular beams. FIG. 8A illustrates yet another embodiment of the present invention, namely, a dual-sided apodization mask 802 disposed along an optical path in the interferometer.

Figure 8B:
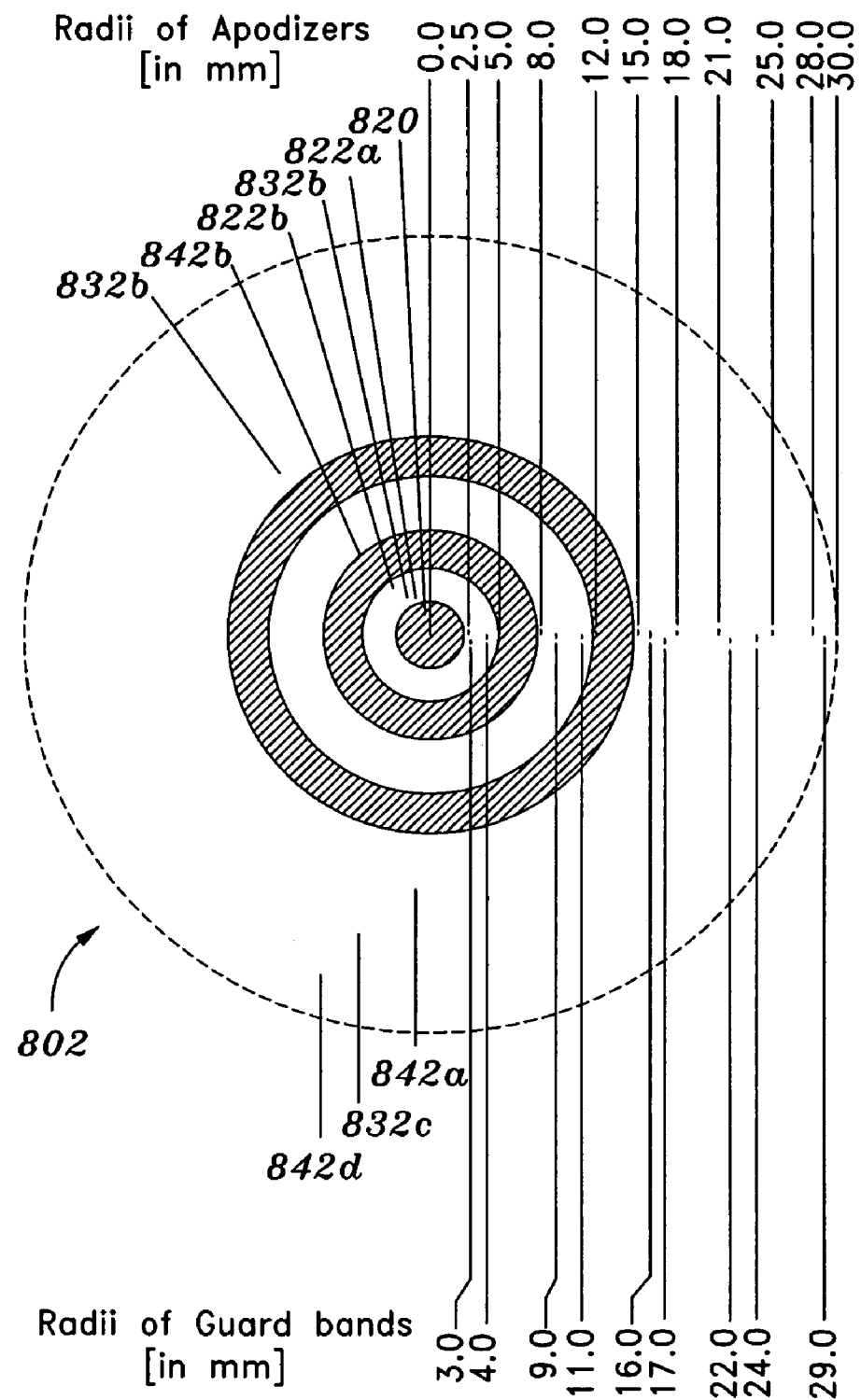

FIG. 8B illustrates the pattern of the mask 802 shown in FIG. 8A. The pattern of the mask 802 has a central opening 820 formed at the center of the mask 802, showing the central mirror 816 behind it. The pattern of mask 802 further comprises a number of concentric annular regions arranged about the central opening 820. Radial dimensions of the guard bands and the apodizers specific to an embodiment of the triax mirror (FIG. 8A) are shown.

There is an apodization region 822a to provide a transition region from the central opening to a shadow region (guard band) 832a. Referring to FIG. 8A, an enlarged view of the triax mirror is provided to show that the dimensions of the pattern of the mask 802 allow for the shadow region 832a to be aligned so as to envelope the inner edge of the annular mirror 814 to reduce or eliminate diffraction artifacts caused by edges. An apodization region 822b provides a transition from the shadow region 832a to a reflective region 842a. The reflective surface of the reflective region 842a faces into the page of the figure. This reflective surface is aligned with one of the two annular beams incident to the inner annular mirror 814. A reflective region 842b is aligned with the other of the two annular beams incident to the inner annular mirror 814 and, like the reflective region 842a, faces into the page. As can be seen in FIG. 8B, the reflective surface 842a and 842b are spaced apart by an apodization region, followed by a shadow region (guard band), followed by an apodization region.

A shadow region 832b is formed between the reflective region 842b and a reflective region 842c. The shadow region 832b blocks light from the space between the inner annular mirror 814 and the outer annular mirror 812. The reflective region 842c has its reflective surface facing out of the page. A shadow region 832c (and the corresponding apodization regions) separate the reflective region 842c from a reflective region 842d. The reflective regions reflect the two annular beams which are incident on the outer annular mirror 812.

Figure 9:
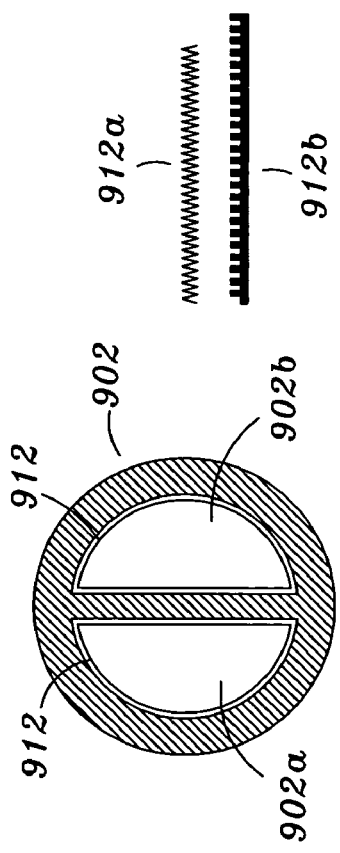
FIG. 9 shows yet another apodization mask pattern.

FIG. 9 shows yet another apodization mask pattern, emphasizing that the pattern can be any suitable shape. Here, an apodization mask is formed with openings 902a and 902b. The apodization regions 912 in each opening are shown as gray regions. One technique for forming the apodization regions 912 is cutout "D" shapes out of opaque material. The edges of the resulting "D" shaped opening can be patterned with a zig-zag shaped edge 912a, or a gear-toothed edge 912b, or by some other similar pattern.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. An interferometry method of operation comprising steps of:
   producing a reference beam of radiation;
   producing a measurement beam of radiation;
   directing said measurement beam of radiation to a target; and
   receiving a reflected beam of radiation, said reflected beam of radiation being a reflection of said measurement beam of radiation off of said target,
   wherein at least one of said foregoing steps includes a step of apodizing a beam of radiation to produce a shaped beam.

2. The method of claim 1 wherein said shaped beam comprises a first beam portion, a second beam portion, and a shadow region that separates said first beam portion and said second beam portion, the method further comprising directing said shaped beam to an optical element that has an edge such that said edge lies within said shadow region.

3. The method of claim 1 wherein said shaped beam comprises a core beam portion, an annular beam portion that encircles said core beam portion, and an annular shadow region that separates said core beam portion and said annular beam portion, the method further comprising directing said shaped beam to a surface that that has an opening such that said core beam portion is transmitted through said opening, said annular shadow region envelopes an edge of said opening, and said annular beam portion is directed to an annular region of said surface that encircles said opening.

4. The method of claim 1 wherein said step of producing a measurement beam of radiation includes reflecting a source beam of radiation off of a reflecting surface to produce a first reflected beam of radiation.

5. The method of claim 4 wherein said reflecting surface includes an apodization mask formed thereon so that said first reflected beam of radiation is patterned by said apodization mask.

6. The method of claim 4 further comprises apodizing said source beam of radiation to shape said source beam of radiation prior to said step of reflecting said source beam of radiation.

7. The method of claim 4 further comprises apodizing said first reflected beam of radiation to shape said first reflected beam of radiation.

8. The method of claim 1 further comprising:
   producing a local oscillator beam;
   mixing a portion of said local oscillator beam with said reference beam of radiation to produce a reference signal; and
   mixing a portion of said local oscillator beam with said reflected beam of radiation to produce a beat signal,
   wherein interferometric measurements can be made by comparing said reference signal with said beat signal,
   wherein said step of producing a reference beam of radiation includes reflecting a source beam of radiation off of a reflecting surface to produce a first reflected beam of radiation.

9. The method of claim 8 wherein said reflecting surface includes an apodization mask formed thereon so that said first reflected beam of radiation is patterned by said apodization mask thereby producing a shaped beam.

10. The method of claim 9 wherein said shaped beam comprises a core beam portion, an annular shadow portion concentric with said core beam portion, and an annular beam portion concentric with said core beam portion, wherein said measurement beam of radiation comprises said core beam portion, wherein said reference beam of radiation comprises said annular beam portion.

11. The method of claim 8 further comprises apodizing said source beam of radiation to shape said source beam of radiation prior to said step of reflecting said source beam of radiation.

12. The method of claim 8 further comprises apodizing said first reflected beam of radiation to shape said first reflected beam of radiation.

13. The method of claim 8 wherein said source beam of radiation is one of infra-red (IR) light, visible light, and ultra-violet (UV) light.

14. An interferometer comprising:
   means for generating one or more source beams;
   one or more first optic surfaces arranged to receive said one or more source beams and to produce a reference beam and a measurement beam from said one or more source beams;
   one or more second optic surfaces arranged to receive and to reflect a return beam, said measurement beam being directed to one or more targets and being reflected therefrom to produce said return beam;
   a plurality of optical paths defined by said first optic surfaces and by said second optic surfaces;
   a photodetector component disposed in line with one of said optical paths; and
   at least one apodization mask disposed in line with one of said optical paths,
   wherein a shaped beam can be produced from a beam incident upon said apodization mask.

15. The interferometer of claim 14 wherein said apodization mask comprises a pattern wherein said shaped beam comprises a first beam portion, a second beam portion, and a shadow region that separates said first beam portion and said second beam portion, wherein said shaped beam is directed to an optical element that has an edge and is incident upon said optical element such that said edge lies within said shadow region.

16. The interferometer of claim 14 wherein said shaped beam comprises a core beam portion, an annular beam portion that encircles said core beam portion, and an annular shadow region that separates said core beam portion and said annular beam portion, wherein said shaped beam is directed to a surface that that has an opening such that said core beam portion is transmitted through said opening, said annular shadow region envelopes an edge of said opening, and said annular beam portion is directed to an annular region of said surface that encircles said opening.

17. The interferometer of claim 14 wherein said first optic surfaces and said second optic surfaces are reflecting surfaces, wherein said at least one apodization mask comprises an apodization pattern disposed on one of said reflecting surfaces.

18. The interferometer of claim 14 wherein said at least one apodization mask is disposed relative to an optic surface such that a beam incident upon said optic surface is shaped by said apodization mask before falling upon said optic surface.

19. The interferometer of claim 14 wherein said at least one apodization mask is disposed relative to an optic surface such that a beam leaving said optic surface is shaped by said apodization mask subsequent to leaving said optic surface.

20. The interferometer of claim 14 where said source beam is one of IR light, visible light, and UV light.

21. An optical interferometer comprising:
a source of a source beam;
an optical component in alignment with respect to said source to receive said source beam therefrom, said optical component configured to emit a measurement beam to a target, said measurement beam being obtained from said source beam; and
a detector in alignment with respect to said optical component, said optical component further configured to receive a return beam from said target, said optical component further configured to transmit one or more output beams to said detector whereby interferometric measurements can be performed, said one or more output beams being obtained from said return beam,
said optical component comprising:
a first reflecting surface arranged to receive said source beam; and
an apodization mask disposed in proximity to said first reflecting surface to shape said source beam to produce a shaped source beam, wherein said measurement beam is obtained from said shaped source beam.

22. The optical interferometer of claim 21 wherein said optical component further comprises a second reflecting surface arranged in alignment with said return beam, and an additional apodization mask disposed in proximity to said second reflecting surface to shape said return beam to produce a shaped return beam.

23. The optical interferometer of claim 21 wherein said optical component further comprises a second reflecting surface having an opening formed therethrough and aligned with respect to said first reflecting surface so that said shaped source beam is transmitted to said second reflecting surface, wherein said shaped source beam comprises:
a core beam portion that can be transmitted through said opening with substantially no diffraction;
an annular shadow portion that envelopes the edge of said opening; and
an annular beam portion that is transmitted to an annular region of said second reflecting surface concentric with said opening.

24. The optical interferometer of claim 23 further comprising a second source to produce a local oscillator beam, said optical component further being in alignment with said second source to receive said local oscillator beam, said optical component configured to mix said return beam with said local oscillator beam to produce a first output beam and to mix said annular beam portion with said local oscillator beam to produce a second output beam.

25. The optical interferometer of claim 24 wherein said apodization mask is deposited on said first reflecting surface.

26. The optical interferometer of claim 24 wherein said apodization mask is formed on a transmissive substrate, said transmissive substrate being disposed along an optical path between said source and said first reflective surface.

27. The optical component of claim 24 wherein said source beam is one of UV light, visible light, and IR light.

28. An interferometer comprising:
one or more first optic surfaces arranged to receive one or more source beams and to produce therefrom a plurality of beams, including a measurement beam;
one or more second optic surfaces arranged to receive and to reflect a return beam, said measurement beam being directed to one or more targets and being reflected therefrom to produce said return beam;
a plurality of optical paths defined by said first optic surfaces and by said second optic surfaces;
a photodetector component disposed in line with one of said optical paths; and
at least one apodization mask disposed in line with one of said optical paths,
wherein a shaped beam can be produced from a beam incident upon said apodization mask.

29. The interferometer of claim 28 wherein said apodization mask comprises a pattern wherein said shaped beam comprises a first beam portion, a second beam portion, and a shadow region that separates said first beam portion and said second beam portion, wherein said shaped beam is directed to an optical element that has an edge and is incident upon said optical element such that said edge lies within said shadow region.

30. The interferometer of claim 28 wherein said shaped beam comprises a core beam portion, an annular beam portion that encircles said core beam portion, and an annular shadow region that separates said core beam portion and said annular beam portion, wherein said shaped beam is directed to a surface that that has an opening such that said core beam portion is transmitted through said opening, said annular shadow region envelopes an edge of said opening, and said annular beam portion is directed to an annular region of said surface that encircles said opening.

31. The interferometer of claim 28 wherein said first optic surfaces and said second optic surfaces are reflecting surfaces, wherein said at least one apodization mask comprises an apodization pattern disposed on one of said reflecting surfaces.

32. The interferometer of claim 28 wherein said at least one apodization mask is disposed relative to an optic surface such that a beam incident upon said optic surface is shaped by said apodization mask before falling upon said optic surface.

33. The interferometer of claim 28 wherein said at least one apodization mask is disposed relative to an optic surface such that a beam leaving said optic surface is shaped by said apodization mask subsequent to leaving said optic surface.

34. The interferometer of claim 28 where said source beam is one of IR light, visible light, and UV light.

* * * * *